United States Patent [19]

Zwijsen et al.

[11] Patent Number: 4,520,393
[45] Date of Patent: May 28, 1985

[54] SYNCHRONIZING CIRCUIT ARRANGEMENT FOR DERIVING AND PROCESSING A SYNCHRONIZING SIGNAL CONTAINED IN AN INCOMING VIDEO SIGNAL

[75] Inventors: Wilhelmus A. J. M. Zwijsen; Cornelis P. J. Duijndam; Wouter Smeulers, all of Eindhoven, Netherlands

[73] Assignee: U.S. Philips Corporation, New York, N.Y.

[21] Appl. No.: 427,056

[22] Filed: Sep. 29, 1982

[30] Foreign Application Priority Data

Oct. 6, 1981 [NL] Netherlands ......................... 8104533

[51] Int. Cl.³ .............................................. H04N 5/04
[52] U.S. Cl. ...................................... 358/149; 358/153
[58] Field of Search ............................... 358/148–159; 375/119, 120

[56] References Cited

U.S. PATENT DOCUMENTS 4,212,032 7/1980 Harford ................................. 358/157
4,303,939 12/1981 Stephens et al. ..................... 358/153

Primary Examiner—Tommy P. Chin
Assistant Examiner—Michael D. Parker
Attorney, Agent, or Firm—Thomas A. Briody; William J. Streeter; Edward W. Goodman

[57] ABSTRACT

A synchronizing circuit arrangement for deriving and processing a synchronizing signal contained in an incoming video signal. The composite synchronizing signal is obtained by means of a comparator stage to which the video signal and a clipping level are applied, and is applied to a line synchronizing circuit. This line synchronizing circuit comprises a synchronization detector for detecting the synchronized state between the line synchronizing pulses obtained and the locally generated pulses of the line frequency. In the synchronized state the peak level detector, by means of which the clipping level is derived, is switched to operate as a mean-value detector which is operative during the occurrence of keying pulses of line frequency occurring during those periods when the video signal assumes a value corresponding with the peak level of the synchronizing pulses.

16 Claims, 3 Drawing Figures

SYNCHRONIZING CIRCUIT ARRANGEMENT FOR DERIVING AND PROCESSING A SYNCHRONIZING SIGNAL CONTAINED IN AN INCOMING VIDEO SIGNAL

BACKGROUND OF THE INVENTION

The invention relates to a synchronizing circuit arrangement for deriving and processing a synchronizing signal contained in an incoming video signal, the synchronizing signal comprising at least line and field synchronizing pulses whose amplitude extends between a reference and a peak level, the circuit arrangement comprising a peak level detector coupled to a signal input of the circuit arrangement for determining the peak level of the synchronizing pulses, a comparator stage having a first input terminal coupled to the signal input, a second input terminal for receiving a clipping level which corresponds to a given level located between the peak and the reference levels, and an output terminal for applying the composite synchronizing signal obtained on the one hand to a field synchronizing signal-separating stage for deriving therefrom the field synchronizing signal and on the other hand to a line synchronizing circuit for generating a locally generated signal of the line frequency, the circuit arrangement further comprising a synchronization detector for determining the synchronized state in which the phase difference between the line synchronizing pulses obtained and the locally generated signal is less than a predetermined value and for changing the mode of operation of portions of the circuit arrangement.

Such a circuit arrangement is disclosed in U.S. Pat. No. 4,185,299. In this prior art circuit arrangement the composite television synchronizing signal is derived by means of a clipping level which is located between the peak and the reference levels, the reference level being approximately the black level of the video information of the video signal. For a negative-going synchronizing pulse, the clipping level is located above the detected peak level at a distance which is approximately equal to the base emitter-threshold voltage of a conducting transistor. If the level of the incoming video signal varies so rapidly that the gain control circuit of the receiver, of which the known circuit forms part, cannot respond, then it may happen that the peak level detector cannot follow the shift produced. In that case, however, the synchronizing detector, which is in the form of a coincidence stage, initiates the non-synchronized state in which the phase difference between the line synchronizing pulses and the locally generated pulses of line frequency is greater than the said predetermined value. The synchronizing detector then renders a recovery circuit operative, which causes a fast variation of the clipping level whereby the loss in synchronizing pulses is reduced.

A circuit arrangement comprising a peak detector has the disadvantage that if the incoming signal contains much noise and interference, the level determined thereby may be incorrect. This can be seen if a disturbing pulse of a large amplitude which is superposed on a synchronizing pulse, is considered. With the known circuit this results in a shift in the clipping level, which may result in a shift of the instant at which the output pulse of the comparator stage occurs.

SUMMARY OF THE INVENTION

The invention has for its object to provide a change of operation, however not to compensate for fast level variations of the incoming video signal but to obtain an improved immunity from noise and interferences. To that end, according to the invention the synchronizing circuit arrangement is characterized in that the peak level detector in the synchronized state operates as a mean-value detector during the occurrence of line frequency keying pulses occurring during those periods when the incoming video signal assumes a value corresponding with the peak level, and in the non-synchronized state operates as a peak detector.

Preferably, the circuit arrangement is characterized in that a reference level detector for determining the reference level of the synchronizing pulses in the synchronized state, operates as a mean-value detector during the occurrence of second line frequency keying pulses occurring during those periods when the incoming video signal assumes a value corresponding to the reference level, and operates as a level detector in the non-synchronized state when synchronizing pulses do not occur, a combining state being connected to the peak level detector and to the reference level detector to determine the clipping level.

Advantageously, the circuit arrangement may be characterized in that the comparator stage is only operative in the synchronized state during the occurrence of third keying pulses produced simultaneously with line synchronizing pulses and whose pulse duration is slightly longer than that of a line synchronization pulse, and is operative in the non-synchronized state during the entire line period.

A line synchronizing circuit comprising a phase detector to determine the phase difference between the incoming line synchronizing signal and the locally generated signal derived from an oscillator may be characterized in that in the synchronized state the control voltage generated by the phase detector for application to the oscillator assumes, prior to the occurrence of a line synchronizing pulse, the value which corresponds to the nominal frequency of the oscillator.

In one preferred embodiment, the synchronizing circuit arrangement in accordance with the invention comprises a control circuit for maintaining the amplitude and the direct current level of the synchronizing pulses applied to the comparator stage substantially constant, which control circuit comprises a direct current level detector, which is known per se, namely from U.S. Pat. No. 3,699,256 and whereby the influence of fast variations of the incoming video signal is significantly reduced, and is characterized in that the direct current level detector operates in the synchronized state as a mean-value detector during the occurrence of the first keying pulse and as a level detector in the non-synchronized state.

Advantageously, the circuit arrangement in accordance with the invention may further be characterized in that it also comprises a second comparator stage having a first input terminal for receiving the synchronizing pulses and a second input terminal which in the non-synchronized state is connected to the second input terminal of the first comparator stage and in the synchronized state to a second clipping level which corresponds to the difference between the peak level obtained by means of a sample-and-hold circuit controlled by a line frequency sampling pulse occurring during the first half of each line synchronizing pulse and half the substantially constant amplitude of the synchronizing pulses, the second comparator stage having an output terminal coupled to the field synchronizing signal-separating stage.

The circuit arrangement may also be characterized in that the level detector in the synchronized state comprises a limiter for limiting the input signal of the level detector to substantially the average value thereof.

DESCRIPTION OF THE DRAWINGS

The invention will now be further described by means of example with reference to the accompanying drawings. Herein.

DESCRIPTION OF THE PREFERRED EMBODIMENTS

Figure 1:
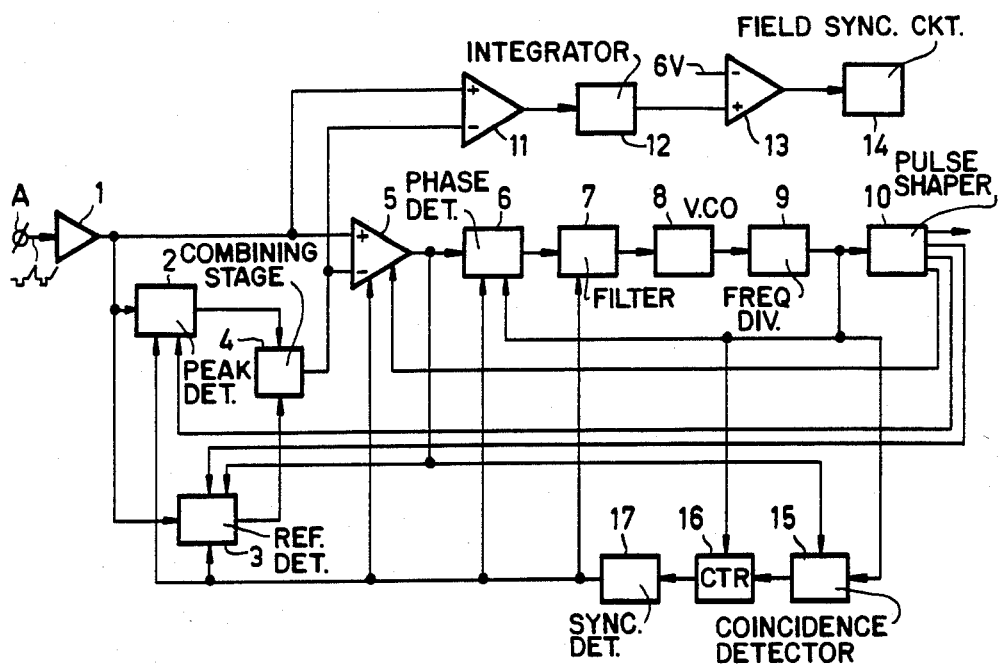
FIG. 1 shows a block schematic circuit diagram of a first embodiment of a synchronizing circuit arrangement in accordance with the invention, which forms part of a television receiver.

In FIG. 1 reference numeral 1 denotes an amplifier to an input terminal A of which a video signal is applied. This signal, which is received and processed in known manner in preceding stages, includes a composite synchronizing signal having descending pulses whose amplitude extends between a reference and a peak level. In accordance with the majority of television standards, the reference level differs very little from the black level of the video information. The amplified video signal is applied to a peak level detector 2 for determining the peak level of the pulses, and to a reference level detector 3 for determining the reference level. Both detectors are constructed in known manner: detector 2 is a peak detector, whereas detector 3 comprises a controlled switch and a peak detector, the switch being operated by the synchronizing pulses, derived by the circuit in such a manner that during the occurrence of these pulses the switch is non-conducting and is conducting at least in a portion of the remaining part of the time. Detectors 2 and 3 can be switched over and the preceding holds for one of the states thereof.

The levels determined by detectors 2 and 3 are applied to a combining stage 4, which comprises an adder stage and a voltage divider to determine a level located between the peak and the reference levels, preferably equidistantly. When the amplitude of the incoming synchronizing signal varies, the relative distance of the clipping level obtained remains fixed with respect to the peak and the reference levels. This clipping level is applied to the inverting input terminal of a comparator stage 5, which is in the form of a differential amplifier to whose non-inverting input terminal the video signal, amplified by amplifier 1, is applied. From this signal, stage 5 only transmits and amplifies the portion located between the peak and the clipping levels. Consequently, the signal at the output terminal of stage 5 is a regenerated synchronizing signal which is substantially free from interferences. This signal is applied to the controlled switch in reference level detector 3 and to a line synchronizing circuit.

The line synchronizing circuit is implemented in the form of a phase control loop comprising a phase detector 6 to which the synchronizing signal from comparator stage 5 as well as a locally generated signal of the line frequency are applied. Phase detector 6 generates a voltage which depends on the phase difference between the signals applied thereto, which voltage is smoothed by a loop filter 7. The smoothed control voltage is applied to a voltage-controlled oscillator 8 for controlling the frequency and/or the phase thereof. Oscillator 8 has a nominal frequency, that is to say in the absence of control voltage, of 625 kHz. The signal therefrom is applied to a frequency divider circuit 9, which divides the frequency by 40. So in the nominal state the frequency of the obtained signal is 15.625 kHz, i.e. the line frequency in accordance with the European standard. By means of a pulse shaper 10, this signal is given the shape which is suitable for a line deflection circuit. Pulse shaper 10 also generates other signals of the line frequency which are required in different places in the circuit arrangement. The signal produced by divider circuit 9, this signal being a square-wave signal, is also applied as a local signal to phase detector 6. In the phase detector 6, the phase difference between an edge of the square-wave and the center of a line synchronizing pulse contained in the signal from stage 5, is determined in known manner for readjusting oscillator 8.

The clipping level, obtained by means of stage 4, is also applied to the inverting input terminal of a second comparator stage 11, which is in the form of a differential amplifier. The non-inverting input terminal of this second comparator stage is connected to the output terminal of amplifier 1. In these circumstances, the output signal therefrom is a composite synchronizing signal which is integrated by an integrator 12. Thereafter the integrated signal is applied to the non-inverting input terminal of a third comparator stage 13, whose inverting input terminal is connected to a voltage, which is derived from the supply voltage and has a value of, for example, 6 V. By a suitable choice of the integration-time constant and this voltage, it can be ensured that the output signal of stage 13 is the field synchronizing signal which is suitable for application to a field synchronizing circuit 14 of a known type. So integrator 12 and stage 13 form a field synchronizing signal-separating circuit.

The signal from frequency divider circuit 9 and the synchronizing signal supplied by comparator stage 5 are also applied to a coincidence detector 15. Therein, the coincidence between these signals is established, that is to say the at least partly simultaneous occurrence thereof. The reference signal from divider 9 is applied to a counter 16 which counts the number of coincidence states in detector 15. So if a predetermined number of coincidence states has occurred, then counter 16 applies a signal to a synchronizing detector 17. If this number is equal to 2, then counter 16 may be in the form of a bistable element. Synchronizing detector 17 has for its object to switch-over certain elements of the circuit arrangement of FIG. 1 as soon as the chosen number, 2 in the example described, is obtained, which consequently may be used as a criterion to establish that the locally generated signal has the frequency and the phase of the incoming line synchronizing signals. One coincidence may alternatively suffice, in other words the synchronized state may be detected as soon as the line phase control loop formed by elements 6 to 9, inclusive is pulled in. In that case counter 16 is omitted. Alternatively, coincidence detector 15 may be replaced by a phase detector, by means of which it is measured whether the phase difference decreases to below a predetermined value.

A switching over action effected by means of synchronizing detector 17 is switching filter 7, whose time constant is brought to a higher value in the synchronized state. This increases the insensitivity to interference of the control loop. In the circuit of FIG. 1, also level detectors 2 and 3 are switched-over. So the above-described operation of the circuit relates to the non-synchronized state, i.e. the state prior to pulling in of the line synchronizing circuit or after the synchronization has become lost, for example on switching to a different transmitter.

Peak level detector 2 is supplied with keying pulses generated by pulse-shaper 10, each having a duration of approximately 3.2 $\mu$s. In the synchronized state, each of these pulses occur within a line synchronization pulse, that is to say its leading edge occurs after the leading edge of a line synchronizing pulse and the trailing edge occurs before the trailing edge of this pulse. In the said state, detector 2 operates as a circuit which determines the mean value of the output signal of amplifier 1 during the occurrence of the keying pulses. For that purpose detector 2 comprises a controlled switch which conducts in response to the keying pulses and, more specifically, only during the occurrences thereof. A voltage, which is approximately the average value of the voltage supplied during the occurrence of each keying pulse, is present across a capacitor. So detector 2 operates as a keyed mean value detector. In the interval between two keying pulses the voltage obtained does not vary substantially and is substantially independent of noise and interferences. During the occurrence of the keying pulses, the capacitor is charged or discharged, respectively, but the variation of the voltage will usually be small, even in the presence of disturbing pulses having a large amplitude. If the noise is symmetrical, that is to say if there is as much signal above the mean value as below it, then the voltage obtained does not vary at all, which is in contrast with the situation prior to the switch-over, the maximum value being obtained by means of peak detection, so that in the presence of noise and interferences, this detected maximum value may be incorrect.

In a similar manner, reference level detector 3 is supplied with keying, pulses which are also generated by pulse-shaper 10 and which in the synchronized state occur after respective line synchronizing pulses and before the respective video information. In the switched-over state, detector 3 operates during the occurrence of each keying pulse as a keyed mean-value detector for the output signal of amplifier 1 and that in the same manner as detector 2. From the foregoing it appears that the levels obtained in this manner and applied to stage 4, and consequently also the clipping level derived therefrom, are affected to a very low extent by noise and interferences.

Also comparator stage 5 is influenced by synchronization detector 17 when the synchronized state has been ascertained. For this purpose stage 5 is supplied with keying pulses which are also generated by pulse-shaper 10, each having a duration of approximately 7 $\mu$s, and a leading edge which occurs before the leading edge of the respective line synchronizing pulse and a trailing edge which occurs after the trailing edge of the respective line synchronizing pulse, which has a duration from 4.5 to 5 $\mu$s. Stage 5 operates only during the occurrence of these keying pulses. Interferences contained in the incoming video signal in the remaining portion of the line period, are not transmitted and consequently cannot produce faulty synchronizing pulses. For this purpose, a controlled switch incorporated in the supply lead of the comparator stage 5 is rendered conductive by synchronization detector 17. This switch and also switches of a similar type for supplying keying pulses intended for level detectors 2 and 3 are not shown in FIG. 1 for the sake of simplicity.

In the synchronized state, also phase detector 6 is influenced by synchronization detector 17, more specifically in such a manner that shortly before the occurrence of a line synchronizing pulse, the output capacitor of detector 6, which has a small capacitance value and across which the control voltage generated by phase detector 6 is present, is connected to the voltage corresponding to the nominal frequency of oscillator 8. As after the occurrence of a keying pulse the output voltage of phase detector 6 does not vary, interference present during the occurrence of a line synchronizing pulse will indeed, after having been smoothed by filter 7, cause a phase error for the next line, but will consequently not be capable of affecting the lines subsequent thereto.

The circuit arrangement of FIG. 1 will operate satisfactorily as long as the direct current level and the amplitude of the video signal applied thereto vary to a little extent only. This will be so in many cases, as the receiver of which the circuit arrangement of FIG. 1 is part, comprises a gain control for controlling the gain of the stages preceding the circuit arrangement, in dependence on the value of the received television signal. In spite of this, the synchronizing pulses contained in the input signal of the circuit arrangement may yet be submitted to unwanted variations, for example because in the incoming signal synchronizing pulses are clipped by saturated cable amplifiers. Amplitude variations may also occur on the reception of signals generated by picture pick-up and display devices.

Figure 2:
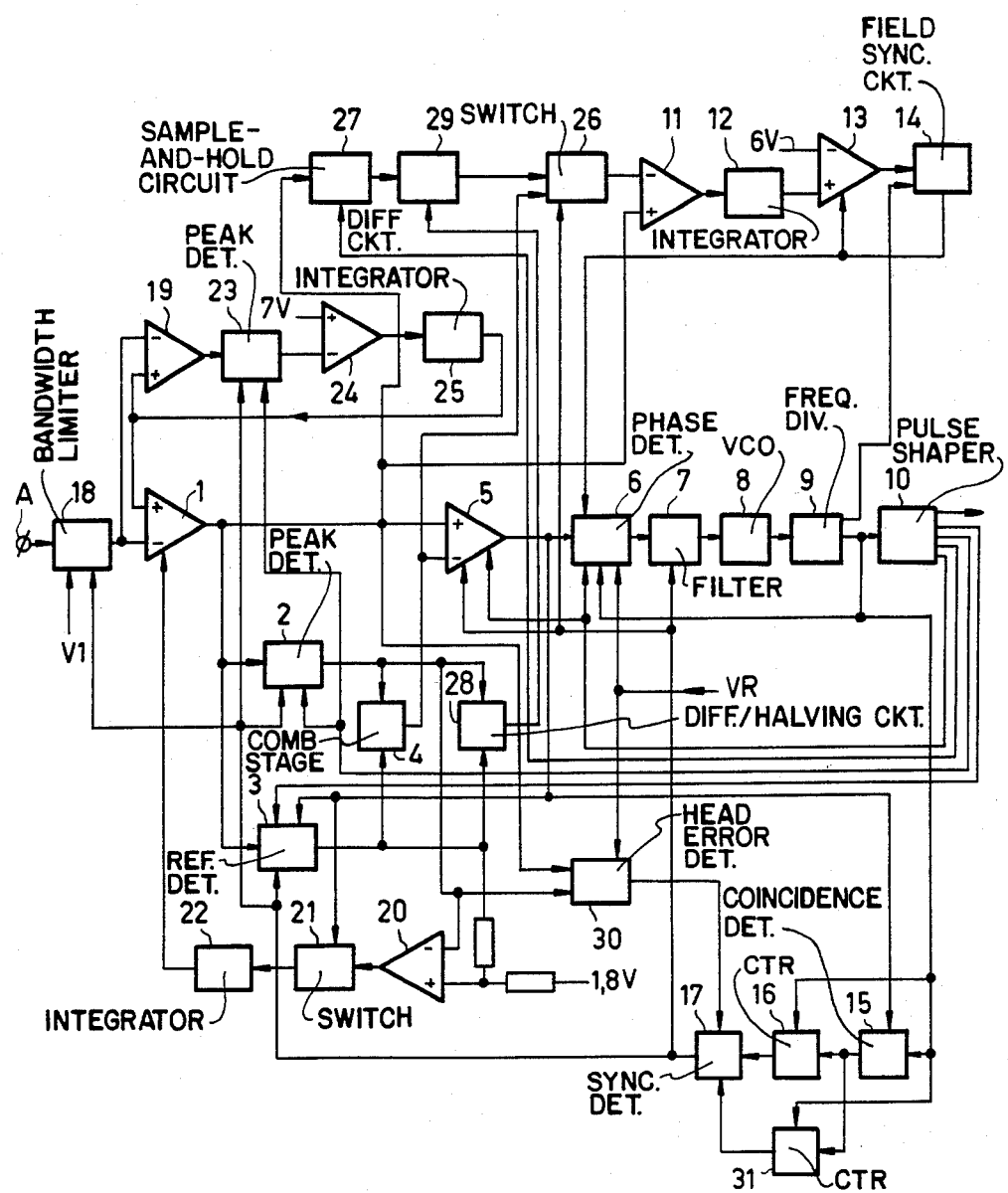
FIG. 2 shows a block schematic circuit diagram of a second embodiment of the circuit arrangement of FIG. 1, this circuit diagram showing more details.

FIG. 2 shows a circuit arrangement which operates satisfactorily also in the event of variations in the video signal. In FIG. 2 the same elements of FIG. 1 are denoted by the same reference numerals. In FIG. 2 the incoming video signal is applied to amplifier 1 via a bandwidth limiter 18, which comprises a low-pass filter for limiting the video signal. As a result thereof, the noise superposed on the video signal is somewhat integrated. The signal obtained reaches the inverting input terminal of amplifier 1 which has a controllable gain, which is for example controllable between 2 and 10 times. With this amplifier, variations in the amplitude of the synchronizing pulses between 0.1 and 1 V can be compensated for. The output of bandwidth limiter 18 is also connected to the inverting input terminal of an amplifier 19 having a fixed gain of, for example, 5 times. The non-inverting input terminals of amplifiers 1 and 19 are interconnected.

Elements 2, 3, 4 and 5 in FIG. 2 are of the same construction and connected in the same way as in FIG. 1. In addition, the peak level obtained by means of detector 2 is applied to the inverting input terminal of a differential amplifier 20 having a fixed gain of, for example, 4 times. The reference level obtained by means of detector 3 is applied to the non-inverting input terminal of said amplifier. A voltage of, for example, 1.8 V is added to the reference level. Via a controlled switch 21, the output terminal of amplifier 20 is connected to an integrator 22, switch 21 being rendered conductive by synchronizing pulses received from comparator stage 5. So the output signal of amplifier 20 is integrated only during the occurrence of these pulses. In this manner, a large integration time constant is obtained without the necessity of giving the capacitor in integrator 22 a high value. The output voltage of integrator 22 is applied to amplifier 1 to determine the gain thereof. From this it appears that elements 2, 3, 20, 21 and 22 are part of a control loop by means of which the amplitude of the synchronizing pulses contained in the output signal of amplifier 1 can be kept substantially constant, namely at a value of approximately 1.8 V.

The output signal of amplifier 19 is applied to a peak level detector 23, which determines the peak level of the synchronizing pulses. The level obtained is compared in a comparator stage 24 with a voltage of, for example, 7 V. Via an integrator 25, the output of stage 24 is fed back to the non-inverting input terminals of amplifiers 1 and 19. So by means of elements 19, 23, 24 and 25, a control loop is realized by means of which the peak level of the signal at the output of amplifier 1 is clamped at approximately 7 V, which value is substantially independent of the location of the peak level of the input signal, which location might have affected the level on the output terminal of amplifier 1. It will be obvious that elements 19 and 23 for keeping the direct current level at the output of amplifier 1 constant, may be combined with the corresponding elements 1 and 2, but this would make the assembly less stable. So the operation of the two described control loops achieves that the video signal applied to comparator stage 5 has a substantially constant amplitude and a substantially constant direct current level.

The operation just described of the control loops holds for the out-of-synchronization state. Peak detector 23 is supplied with the same keying pulses as peak detector 2. In the synchronized state, detector 23 is switched over by means of synchronization detector 17 and then operates during the occurrence of the keying pulses as a keyed mean-value detector. As detectors 2, 3 and 23 are switched over in the same manner, both control loops are little affected by noise and interferences.

Also bandwidth limiter 18 operates in the synchronized state in a different manner than when the line phase control loop has not yet been pulled in. Under the influence of synchronization detector 17, limiter 18 is controlled by the gain control signal $V_1$ which controls the gain of the intermediate frequency stages (not shown) of the receiver and that in such manner that the bandwidth is controlled in dependence on signal $V_1$. The weaker the received television signal, the larger the gain of the intermediate frequency stages and the narrower the bandwidth of the video signal conveyed to amplifier 1. As a result thereof, the video signal contains less noise than otherwise, but the edges of the synchronizing pulses become less steep, which may cause uncertainty about the instants at which these edges reach the clipping level in stage 5 after amplification in amplifier 1. A compromise must therefore be found to keep this time error as small as possible in the event of a weak signal. For a strong signal, the bandwidth is only affected to a small extent so that the pulse edges are as steep as possible. In practice, bandwidth limiter 18 may be in the form of an RC-integration network, the resistor being shunted by a transistor, for example a field effect transistor. This transistor is non-conducting in the out-of-synchronization state. In the synchronized state, voltage $V_1$ is applied to the input electrode of the transistor, because the internal resistance of the transistor which is arranged in parallel with the resistor to be dependent on voltage $V_1$ and changes the time constant of the RC-network. A given, but less strong limitation of the bandwidth, also takes place at a high signal value, which has been found to be necessary as it may happen that a strong and yet noisy television signal is received, for example a signal conveyed by a cable system.

The field synchronizing signal-separating stage in FIG. 2 is preceded by a controlled change-over switch 26. A common output terminal thereof is connected to the inverting input terminal of comparator stage 11. In the out-of-synchronization state of detector 17, the clipping level obtained by means of stage 4 is conveyed to stage 11 via change-over switch 26. In the synchronized state, switch 26 is brought under the control of detector 17 into a state in which a different clipping level is conveyed, the reason being that the detectors 2 and 3 which operate as integrators in the synchronized state cannot respond sufficiently rapidly to the situation in which significant echos of a rather long duration, more than approximately 3 $\mu$s, are superposed on a white picture. At the beginning of the field blanking interval, echo images of this type may cause a rapid direct current shift of the level of the video signal applied to amplifier 1, with the effect that the field synchronizing signal can be lost.

The output signal of amplifier 1 is applied to a sample-and-hold circuit 27, which receives a sampling pulse of line frequency from pulse shaper 10. This pulse has a duration of approximately 1 $\mu$s and occurs during the first half of the line synchronizing pulses and of the equalizing and field synchronizing pulses occurring in the field blanking interval instead of line synchronizing pulses. So circuit 27 determines the average value of the peak level of the pulses, which level, if necessary, can vary rapidly. The peak level from detector 2 and the reference level from detector 3 are applied to a stage 28, in which stage half the difference between the levels applied thereto is determined. The level obtained corresponds to half the substantially constant amplitude of the synchronizing pulses contained in the output signal of amplifier 1. In a stage 29 this level is subtracted from the level in circuit 27, and in the synchronized state, the result is used as the clipping level. As no unwanted, rapid shift occurs in the incoming video signal then this clipping level is substantially the same as the "slow" clipping level obtained by means of stage 4.

From frequency divider circuit 9, field synchronizing circuit 14 receives a signal of twice the line frequency. In known manner, this frequency is divided in circuit 14 for obtaining the field frequency and the phase of the signal obtained is compared with that of the field synchronizing signal produced by comparator stage 13. Circuit 14 also comprises a synchronization detector circuit, similar to circuits 15, 16 and 17, which for simplicity is not shown in FIG. 2, to ascertain that coincidence between the two signals of field frequency has occurred for a given number of times, for example 6 times. In a similar manner as comparator stage 5, comparator stage 13 becomes operative only during that portion of the field frequency in which the field synchronizing signal may be expected, so that interferences occurring in the remaining portion of the period do not affect the field synchronization. For this purpose stage 13 receives from the synchronization detector circuit in circuit 14 keying pulses having a duration of at least that portion of the field blanking interval which comprises the field synchronizing signal. The same keying pulses are also applied either to line phase detector 6, or to stage 5 to put it out of operation, as a result of which the known instability which may occur at the beginning of a field in the line synchronizing circuit is eliminated.

The circuit arrangement of FIG. 2 comprises also a head error detector 30. Owing to errors of the playback heads of a picture pick-up and display device, it may happen that the received synchronizing pulses are shifted such in the time that the keying pulses applied to detectors 2 and 3 in the synchronized state suddenly pass into the video information. Then a large difference occurs between the previously detected peak level and the video signal now applied. This difference is measured by detector 30 which, on receipt of signals from a pick-up and display device, is made operative by a signal VR. If the difference between the amplitude of the video signal at the output terminal of amplifier 1 and the peak level determined by detector 2 achieves a predetermined value, for example 0.5 V, then head error detector 30 will immediately adjust synchronization detector 17 to the out-of-synchronization state, causing the stages controlled by the detector 17 to be changed over. Signal VR is also applied to phase detector 6 to increase, for example by a factor of 6, the loop gain of the line phase control loop.

Finally, the circuit arrangement of FIG. 2 comprises a counter 31 which, as does also counter 16, receives the signal of the line frequency as a clock signal from frequency divider circuit 9 and is reset by coincidence detector 15. Counter 31 counts the number of times coincidence has not occurred after the synchronized state has prevailed, for example because a change to a different transmitter has been effected. If this number exceeds a predetermined value, for example 16, then counter 31 adjusts synchronization detector 17 to the out-of-synchronization state, in which state the circuit of FIG. 2 is indeed sensitive to interferences but is rapidly adjusted to the synchronized state.

Starting problems may occur with the circuit arrangement of FIG. 2, amplifier 1 having too low a gain and stage 5 not generating a synchronizing pulse. In that case the switch in detector 3 cannot become conductive. The circuit may be dimensioned in such a manner that the situation outlined above does not occur. This situation will with certainty not occur when the switch is not controlled by a pulse produced by stage 5 but by the output signal from a detector which determines the difference between the output signals of amplifier 1 and detector 2. This detector, which is comparable with the above-described detector 30, applies a signal to the switch in detector 3, causing this switch to become conductive in a period of time in which the synchronizing pulses have the reference level, if the measured difference exceeds a predetermined value.

Figure 3:
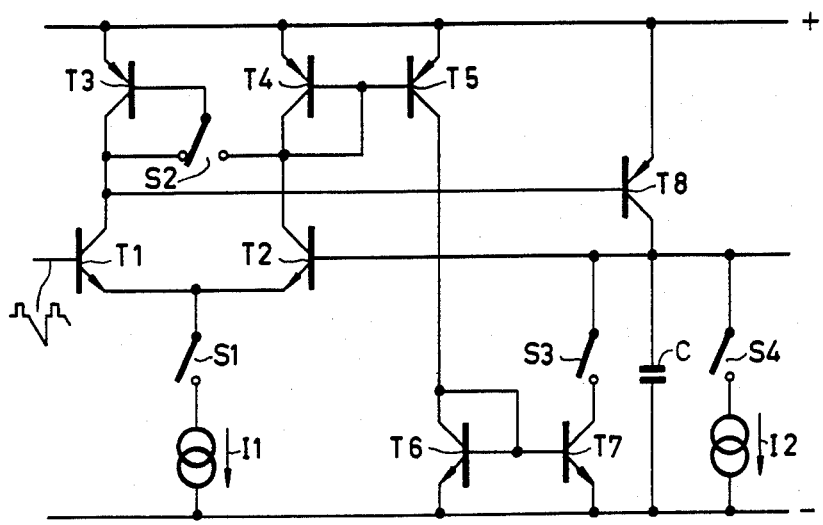
FIG. 3 shows a circuit diagram of a level detector suitable to be incorporated in the arrangement of FIG. 1 or 2.

The majority of elements in the circuit arrangement of FIGS. 1 or 2 may be of a known construction, so that they need not be described in further detail. FIG. 3 shows a circuit which may be used for detectors 2 and 23.

In FIG. 3, the emitters of two npn transistors T1 and T2 are interconnected and connected to a switch S1. The collector of transistor T1 is connected to the collector of a pnp transistor T3, whose emitter is connected to the positive terminal of a supply voltage source. In a similar manner the collector of transistor T2 is connected to the collector of a pnp transistor T4 whose emitter is connected to the positive terminal. The base of transistor T1 is the input of the circuit, during operation the video signal amplified by amplifier 1 is present on this input. Via a switch S2, the base of transistor T3 may be connected either to the collector of transistor T3 or to the collector of transistor T4. A current source I1 is arranged between switch S1 and the negative terminal of the supply source.

The base of transistor T4 is connnected to the collector thereof and to the base of a further pnp transistor T5 whose emitter is connected to the positive terminal of the supply source, while the collector thereof is connected to the collector and to the base of an npn transistor T6 and to the base of a further npn transistor T7. The emitters of transistor T6 and T7 are connected to the negative terminal. Via a switch S3, the collector of transistor T7 is connected to the base of transistor T2. A capacitor C is arranged between this base and the negative terminal of the supply source. Parallel therewith is the series arrangement of a switch S4 and a current source I2. Finally, the circuit comprises a pnp transistor T8 whose base is connected to the collector of transistor T1 and the collector to the base of transistor T2, while the emitter is connected to the positive terminal. That terminal of capacitor C which is connected to the base of transistor T2, is the output of the circuit of FIG. 3.

Switches S1, S2, S3 and S4 are operated by pulses from detector 17 and that in such a manner that in the situation in which detector 2 operates as a peak level detector, switches S1 and S4 conduct, while switch S3 is not-conducting, and while switch S2 connects the base of transistor T3 to the collectors of transistors T2 and T4. In this situation transistors T1 and T2 and source T1 form a differential amplifier. If the input voltage exceeds the output voltage, then transistor T1 conducts, as its collector is connected to the positive terminal of the supply source via the transistors T3 and T4 which operate as diodes, while transistor T2 is cutoff. Transistor T8 also conducts and the difference between its collector current and current I2 charges capacitor C. As current I2 has a low value, this difference is positive so that the voltage across capacitor C increases. If the maximum value of the input signal, i.e. the peak level of the synchronizing pulses, has been reached, then transistor T1 stops conducting. Current I1, which flowed therethrough, now flows through transistor T2, while capacitor C is slowly discharged by current I2. By means of this current, a detection resistance of a high value is as if it were arranged in parallel with capacitor C.

In the other state of the circuit of FIG. 3, switch S3 conducts while switch S4 is non-conducting and while switch S2 interconnects the base and the collector of transistor T3. Switch S1 now only conducts during the occurrence of the keying pulses. Transistors T3 and T8 now form a first current mirror and transistors T4 and T5 form a second current mirror. As the emitter current of transistor T1 or T2, respectively, cannot exceed the value I1, the currents produced by the two current mirrors cannot increase to above predetermined values. As a result thereof the input signal is sliced.

If during the occurrence of the keying pulses the input and the output voltages are equal to each other, then the collector currents of transistors T1 and T2 are equal. A charging current for capacitor C flows through transistor T8, while the collector current of transistor T7 is a discharging current, these currents being equal, thanks to a suitable dimensioning. So the voltage across the capacitor does not vary. If the input and the output voltages are not equal to each other, then the collector currents of transistors T1 and T2 are not equal, as a result of which capacitor C is charged or discharged. Then the output voltage increases or decreases. After the occurrence of the keying pulse, switch S1 is inhibited and the output voltage does not change until the next keying pulse. If during the occurrence of the keying pulse, the area of the time diagram of the limited input signal above the value obtained for the output voltage, is not equal to the area thereunder, then the charging or discharging current, respectively, continues to flow until the areas are equal. So the circuit so adjusts itself that the output voltage thereof corresponds to the average value of the limited input signal. If the input signal comprises few noise pulses of a large amplitude, then the value obtained is substantially equal to the average value of the input signal. Consequently, the limitation must be considered as a refinement.

The circuit shown in FIG. 3 may be used for detector 3, the difference being that in the state in which detector 3 is operative as a reference level, detector switch S1 will be inhibited at least during the occurrence of the synchronizing pulses. It will be clear that detectors 2 and 3 may be implemented in a different manner than shown in FIG. 3. Instead of comprising a combined circuit, these detectors may, for example, each comprise a level detector and a keyed mean-value detector, the amplified video signal being applied to both of the portions and either the one or the other portion supplying the output signal.

In view of the large number of elements in the described circuit, it will be obvious that the circuit arrangements will preferably be produced predominantly in the form of integrated circuits. The what is commonly referred to as LOCMOS technique has been found to be very advantageous.

What is claimed is:

1. A synchronizing circuit arrangement for deriving and processing a synchronizing signal contained in an incoming composite video signal, the synchronizing signal comprising at least line and field synchronizing pulses whose amplitude extends between a reference and a peak level, the circuit arrangement comprising a peak level detector coupled to a signal input of the circuit arrangement for detecting the peak level of the synchronizing pulses, a reference level detector coupled to the signal input of the circuit arrangement for detecting the reference level of the synchronizing pulses, means coupled to said reference and said peak level detectors for determining a clipping level located between the peak and reference levels, a first comparator stage having a first input terminal coupled to the signal input, a second input terminal for receiving said clipping level, and an output terminal for applying the synchronizing signal separated from the composite video signal to a line synchronizing circuit for generating a locally generated signal of the line frequency, the circuit arrangement further comprising a synchronization detector stage for establishing a synchronized state in which the phase difference between the line synchronizing pulses in the synchronizing signal and pulses in the locally generated signal is less than a predetermined value and for changing the mode of operation of portions of the circuit arrangement, characterized in that the peak level detector is active only during the occurrence of first line frequency keying pulses applied thereto and is controlled by said synchronization detector stage whereby in the synchronized state, said peak level detector operates as a mean-value detector, and in a non-synchronized state, said peak level detector operates as a peak detector.

2. A circuit arrangement as claimed in claim 1, characterized in that a leading edge of each of said first line frequency keying pulses occurs after a leading edge of a respective line synchronizing pulse and a trailing edge of each of said keying pulses occurs before a trailing edge of said respective line synchronizing pulse.

3. A circuit arrangement as claimed in claim 1, characterized in that the reference level detector is active only during the occurrence of second line frequency keying pulses applied thereto and is controlled by said synchronization detector stage whereby in the synchronized state, said reference level detector operates as a mean-value detector, and said reference level detector operates as a level detector in the non-synchronized state when synchronizing pulses do not occur.

4. A circuit arrangement as claimed in claim 3, characterized in that a leading edge of each of said second keying pulses occurs after a trailing edge of a respective line synchronizing pulse and a trailing edge of said second keying pulse occurs before the beginning of video information contained in said composite video signal.

5. A circuit arrangement as claimed in claim 1, characterized in that the first comparator stage is only operative in the synchronized state during the occurrence of third line frequency keying pulses applied thereto and produced simultaneously with line synchronizing pulses and whose pulse duration is slightly longer than that of a line synchronizing pulse, and is operative, in the non-synchronized state, during the entire line period.

6. A circuit arrangement as claimed in claim 1, in which the line synchronizing circuit comprises a phase detector for determining the phase difference between the incoming line synchronizing signal and the locally generated signal derived from an oscillator, characterized in that said phase detector is controlled by said synchronization detector stage whereby in the synchronized state, a control voltage generated by the phase detector for application to the oscillator assumes, prior to the occurrence of a line synchronizing pulse, a value which corresponds to the nominal frequency of the oscillator.

7. A circuit arrangement as claimed in claim 1, further comprising a control circuit for maintaining the amplitude and the direct current level of the synchronizing pulses applied to the first comparator stage substantially constant, which control circuit comprises a second peak level detector, characterized in that the second peak level detector is active only during the occurrence of said first line frequency keying pulses applied thereto and is controlled by said synchronization detector stage whereby said second peak level detector operates, in the synchronized state as a mean-value detector and as a level detector in the non-synchronized state.

8. A circuit arrangement as claimed in claim 7, characterized in that the circuit arrangement also comprises a second comparator stage having a first input terminal for receiving the composite video signal and a second input terminal which, in the non-synchronized state, is connected to the second input terminal of the first comparator stage and, in the synchronized state, is connected to a second clipping level which corresponds to the difference between the peak level obtained by means of a sample-and-hold circuit controlled by a line frequency sampling pulse occurring during the first half of each line synchronizing pulse and half the substantially constant amplitude of the synchronizing pulses, the second comparator stage having an output terminal coupled to a field synchronizing signal-separating stage.

9. A circuit arrangement as claimed in claim 8, wherein said synchronization detector stage comprises a coincidence stage for detecting coincidence between the field synchronizing pulses separated from said composite video signal and locally generated pulses of the field frequency, a counter for counting the number of times coincidence has been detected, and a synchronization detector coupled to said counter for generating field keying pulses, characterized in that either the first comparator stage or said phase detector is rendered inoperative during the occurrence of said field keying pulses when the number of times coincidence occurs is at least equal to a predetermined number, each of these field keying pulses occurring at least in that portion of the field blanking interval which contains the field synchronizing signal.

10. A circuit arrangement as claimed in claim 9, characterized in that the field synchronizing signal-separating stage is only operative during the occurrence of said field keying pulses.

11. A circuit arrangement as claimed in claim 7, characterized by a head error detector for determining the difference between the substantially constant amplitude of the synchronizing pulses and the peak level determined by the peak level detector and for controlling the synchronization detector for initiating the non-synchronized state when said difference is greater than a predetermined value.

12. A circuit arrangement as claimed in claim 1, characterized in that a bandwidth limiter for limiting the bandwidth of the incoming video signal is coupled between the signal input of the circuit arrangement and the first input terminal of the first comparator stage, the bandwidth being controlled in the synchronized state under the influence of a gain control signal, the weaker a received television signal containing the incoming video signal the narrower the bandwidth.

13. A circuit arrangement as claimed in claim 1, characterized in that said circuit arrangement further comprises a coincidence detector for indicating coincidence between the separated synchronizing pulses and the locally generated signal of line frequency, and a counter for counting the number of times coincidence has been detected, said counter controlling the synchronization detector for initiating the synchronized state when said coincidence detector has detected coincidence for a predetermined number of times.

14. A circuit arrangement as claimed in claim 13, characterized in that a further counter controls the synchronization detector for initiating the non-synchronized state when said coincidence detector has not detected coincidence for a predetermined number of times.

15. A circuit arrangement as claimed in claim 1, characterized in that the peak level detector comprises a limiter for limiting, in the synchronized state, the input signal of the peak level detector to substantially the average value thereof.

16. A circuit arrangement as claimed in claim 15, characterized in that the limiter comprises a differential amplifier for comparing the input signal and the output signal of the peak level detector and for charging or discharging, respectively, a capacitor, the voltage of the capacitor being the peak level detector output signal.

* * * * *